United States Patent
Durliat et al.

[11] Patent Number: 6,053,371
[45] Date of Patent: Apr. 25, 2000

[54] PUMP DISPENSER AND METHOD FOR MAKING SAME

[75] Inventors: Leonora M. Durliat, Toledo; Paul R. Graham, Holland, both of Ohio

[73] Assignee: Owens-Illinois Closure Inc., Toledo, Ohio

[21] Appl. No.: 09/079,481

[22] Filed: May 15, 1998

[51] Int. Cl.[7] .............................. G01F 11/36; B67D 5/40
[52] U.S. Cl. ........................................ 222/321.9; 222/385
[58] Field of Search ................................... 222/385, 321.7, 222/321.9, 321.1, 321.2, 341

[56] References Cited

U.S. PATENT DOCUMENTS

| | | |
|---|---|---|
| 2,521,961 | 9/1950 | Bacheller . |
| 3,044,413 | 7/1962 | Corsette . |
| 3,062,416 | 11/1962 | Cooprider . |
| 3,064,310 | 11/1962 | Cooprider . |
| 3,084,873 | 4/1963 | Corsette . |
| 3,128,018 | 4/1964 | Corsette et al. . |
| 3,179,306 | 4/1965 | Corsette . |
| 3,191,814 | 6/1965 | Corsette et al. ........................ 222/384 |
| 3,229,864 | 1/1966 | Roder . |
| 3,248,021 | 4/1966 | Corsette et al. . |
| 3,359,917 | 12/1967 | Cooprider . |
| 3,361,078 | 1/1968 | Cooprider . |
| 3,362,344 | 1/1968 | Duda . |
| 3,458,090 | 7/1969 | Scoggin, Jr. . |
| 3,578,203 | 5/1971 | Mainet . |
| 3,759,426 | 9/1973 | Kane et al. . |
| 4,089,442 | 5/1978 | Hafele et al. ........................ 222/385 X |
| 5,381,932 | 1/1995 | Humphrey ........................ 222/385 X |

FOREIGN PATENT DOCUMENTS 2119868 1/1986 United Kingdom .

*Primary Examiner*—Kevin Shaver
*Assistant Examiner*—Keats Quinalty

[57] ABSTRACT

The dispenser comprises a hollow body formed adjacent its upper end with an inward and downward annular flap. The method involves the molding of the body with the flap inclined upward. A tool is inserted into the open end of the body to fold the flap downward. In assembly, with the tool removed and the flap thus folded, the plunger moves past the flap so that the flap thereafter engages a shoulder on the plunger and forms an obstacle to the subsequent removal, accidental or otherwise, of the plunger.

7 Claims, 3 Drawing Sheets

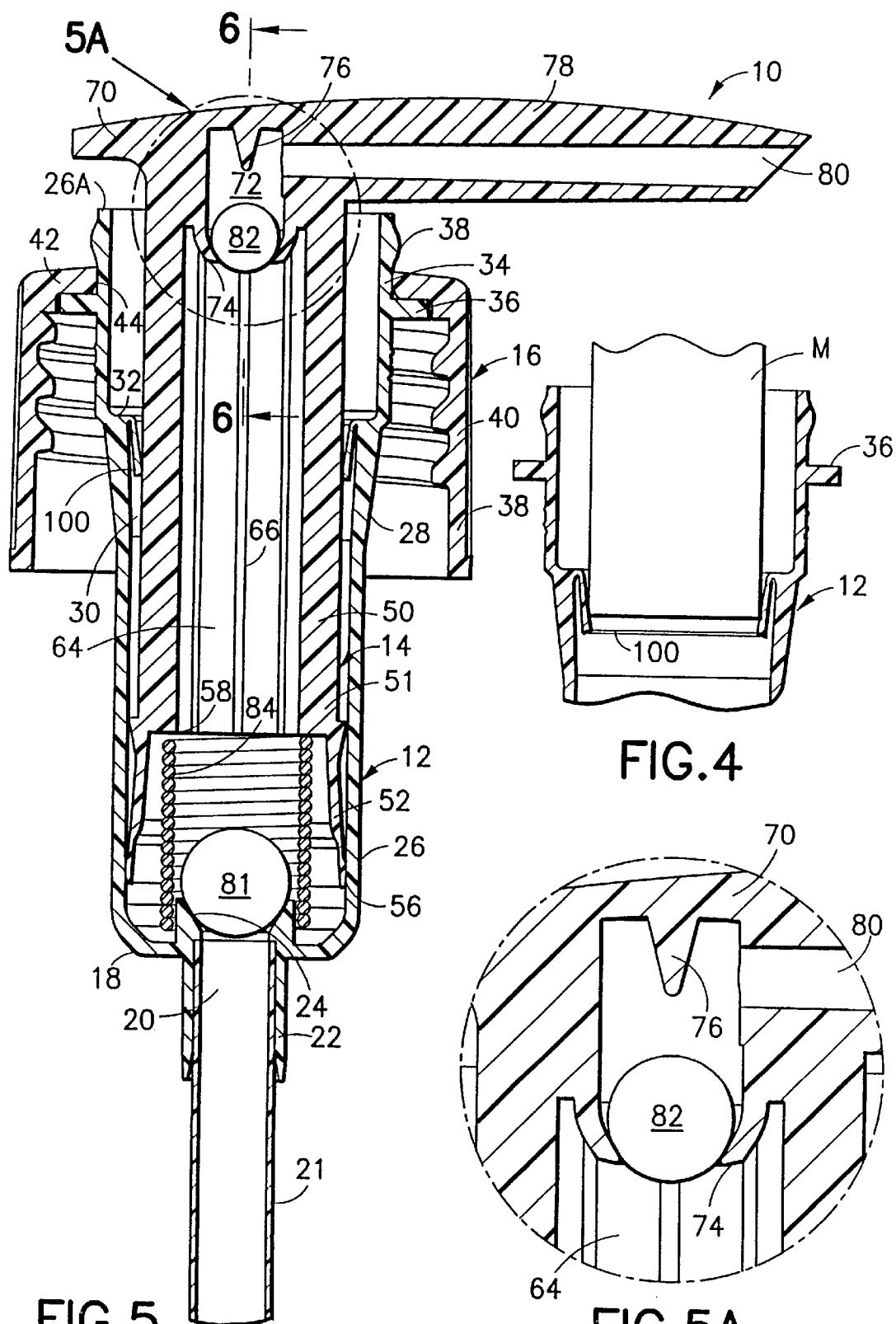

6,053,371

PUMP DISPENSER AND METHOD FOR MAKING SAME

FIELD OF THE INVENTION

This invention relates to a pump dispenser. More specifically, this invention relates to a pump dispenser in which a plunger reciprocates inside a hollow cylindrical body. The plunger includes a piston and an upward actuator defining a discharge spout.

BACKGROUND OF THE INVENTION

The U.S. Pat. No. 3,062,416 to Cooprider, issued Nov. 6, 1962, discloses a liquid dispenser comprising a hollow body and a one-piece plunger including an actuator/piston. The piston has an enlarged head at its lower end inside the hollow body. Inlet and outlet check valves are provided and a spring urges the plunger upward.

In assembly, after the Cooprider plunger is installed in the body, a tool is brought down against the upper end of the body. The lower end of the tool is so shaped as to cause the plastic of the body to be swaged inwardly thus providing a blocking flange to trap the plunger in the body.

SUMMARY OF THE INVENTION

The present invention is a pump dispenser and a method for making it. The dispenser comprises a hollow body having molded about the inside of its mouth an inward and downward annular flap. A dispenser plunger, which is biased upward by a spring, operates in the body and is held in by the flap.

The method involves the molding of the body with the flap extending inward and upward. A tool is inserted into the open end of the body so that it engages the flap and folds the flap to the inward and downward position. With the flap thus folded and the tool removed, the plunger is inserted into the body, engaging the flap and moving downward. The plunger is reduced in diameter above the lower end to define an annular upwardly facing shoulder. Once the shoulder has passed the flap, the flap, directed downwardly, forms an obstacle to the removal, accidental or otherwise, of the plunger. Thus, the plunger is retained in the body.

The molding of the flap and the step of folding it down makes unnecessary the swaging step to shape a blocking flange as disclosed, for instance, in the Cooprider patent.

The invention also includes plunger lock-down means comprising an outward pin on the actuator portion of the plunger and a bayonet slot in the upper wall of the cylinder body adapted to receive the pin and, after a turn of the plunger, hold the plunger down against the upward force of the spring.

BRIEF DESCRIPTION OF THE DRAWINGS

Further objects and features of the invention will be clear to those skilled in the art from a review of the following specification and drawings, all of which present a non-limiting form of the invention. In the drawings:

FIGS. 2, 3 and 4 are fragmentary progressive views of the insertion of the tool or mandrel into the body to fold the flap downward;

FIG. 5 is an enlarged sectional view of an assembled pump dispenser embodying the invention;

FIG. 5A is an enlarged fragmentary sectional view of a portion of FIG. 5;

DESCRIPTION OF THE PREFERRED EMBODIMENT

Figure 1:
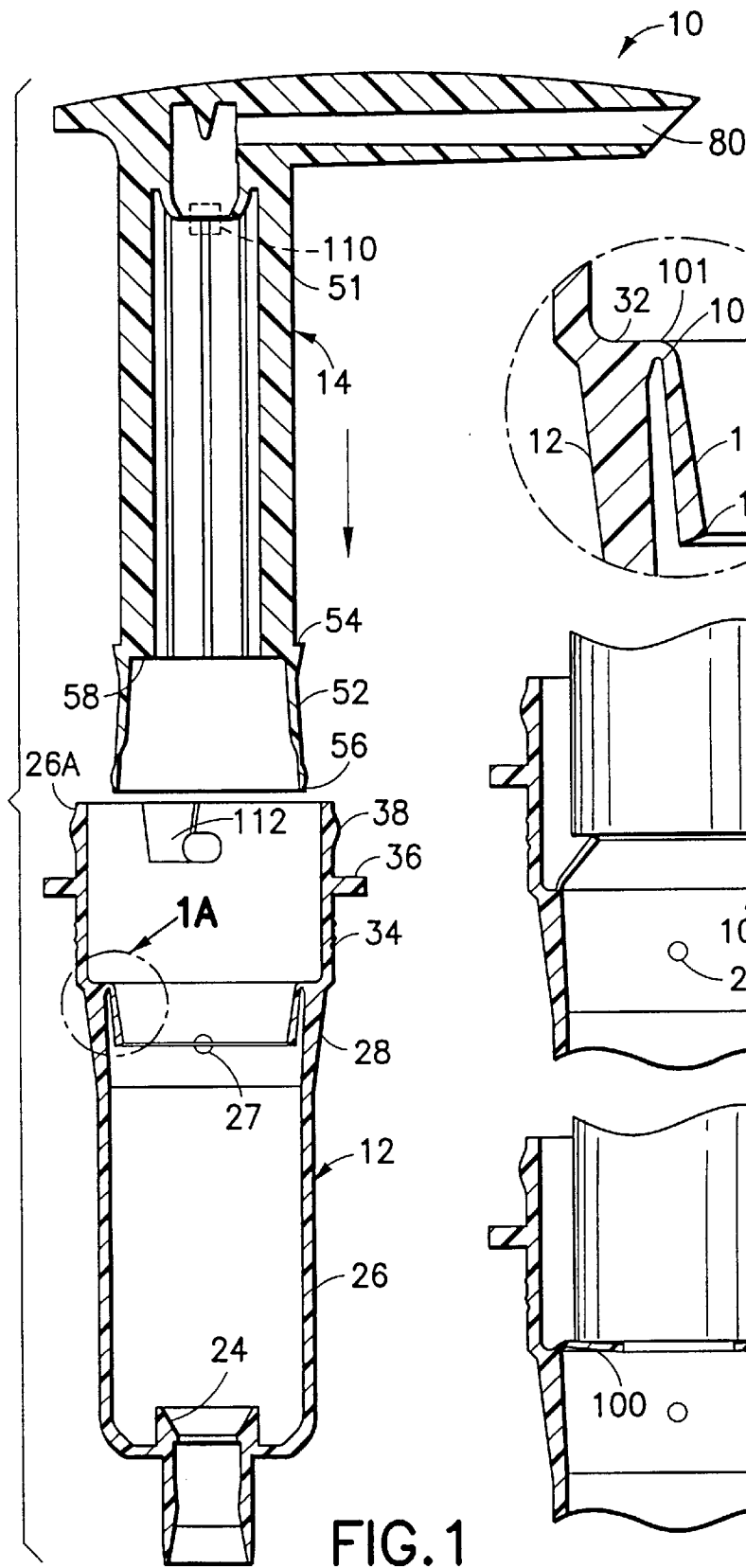
FIG. 1 is an exploded sectional view of the plunger and the body of a dispenser embodying the invention.

A pump dispenser embodying the invention is generally designated 10 in FIG. 5. It comprises a hollow cylindrical body 12 and a cooperating one-piece plunger 14. Rotatably surrounding the upper end of the body is the threaded closure 16.

Referring more specifically to the body 12, it is essentially cup-shaped including a bottom wall 18 which is centrally formed with an inlet opening 20 surrounded by a downward tubular connector 22 receiving a dip tube 21. Above the opening 20 is formed an upward bevelled annular seat 24. A cylindrical side wall 26 extends upward from the perimeter of bottom wall 18 and terminates in a circular mouth 26A.

The sidewall 26 (FIG. 1) extends upward to include a vent opening 27 and a tapered zone 28 at which the wall flares slightly outward on the inside of the body at surface 30 (FIG. 5) and is thickened as the upper end of the body 12 is approached. Above the tapered zone 28 the side wall is formed on the inside of the body with an annular radial shoulder 32. From the periphery of the shoulder the side wall extends upward in a cylindrical sleeve 34. Outward from a midpoint of the sleeve portion extends an integral annular flange 36, and spaced above the flange the cylindrical sleeve is formed with an outward peripheral bump 38.

The closure 16 (FIG. 5) is a threaded cap comprising a sidewall 40 and a top wall 42 which is formed with an aperture 44 to receive the cylindrical sleeve 34 at the upper end of the body. In installation, there is sufficient "give" in the bump 38 and the margin of the aperture 44 to permit the top wall 42 to snap by the bump so that the cap is entrapped between the bump 38 and the flange 36.

The cap is loosely enough disposed on the sleeve 34 so that it can spin as it is screwed onto the finish (not shown) of a container. The flange 36 will, of course, sit on the top of the finish and be sealingly compressed thereagainst when the cap is screwed tight.

The plunger 14 comprises an elongate tubular piston 50. The piston 50 is defined by a stem 51 and an enlarged tubular piston head 52. Intermediate the head and the stem there is formed a narrow annular upward shoulder 54. The lower end of the head is formed with an annular seal 56 sealingly engaging the inside of the side wall 26 of the body 12. Inside, above the seal 56, the head presents an annular downward face 58.

As stated, the plunger 14 is tubular, formed with an axial passage 64 which may be provided with integral inward ribs 66.

At the upper end of the plunger 14 and unitary therewith is the plunger 14. The actuator 70 is formed with a check valve compartment 72 (FIG. 5A) at the lower end of which is an inward annular lip 74. A central ball stop 76 extends downward from the actuator head into the upper portion of the compartment 72. A laterally extending portion of the actuator 70 forms the spout 78 (FIG. 5) having a discharge passage 80.

Both the body 12 and the plunger 14 are molded of a plastic, such as high density polyethylene, which is resilient in thin sections and rigid in thick section. The resilience in thin sections is used to advantage in the lip 74 piston seal 56 and in the flap 100 adjacent the sidewall 28, to be explained.

Figure 6:
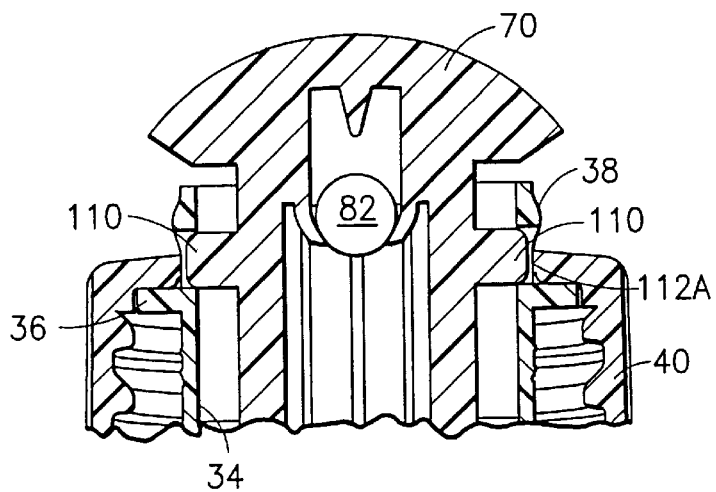
FIG. 6 is a fragmentary sectional view taken on the line 6—6 of FIG. 5.
Figure 7:
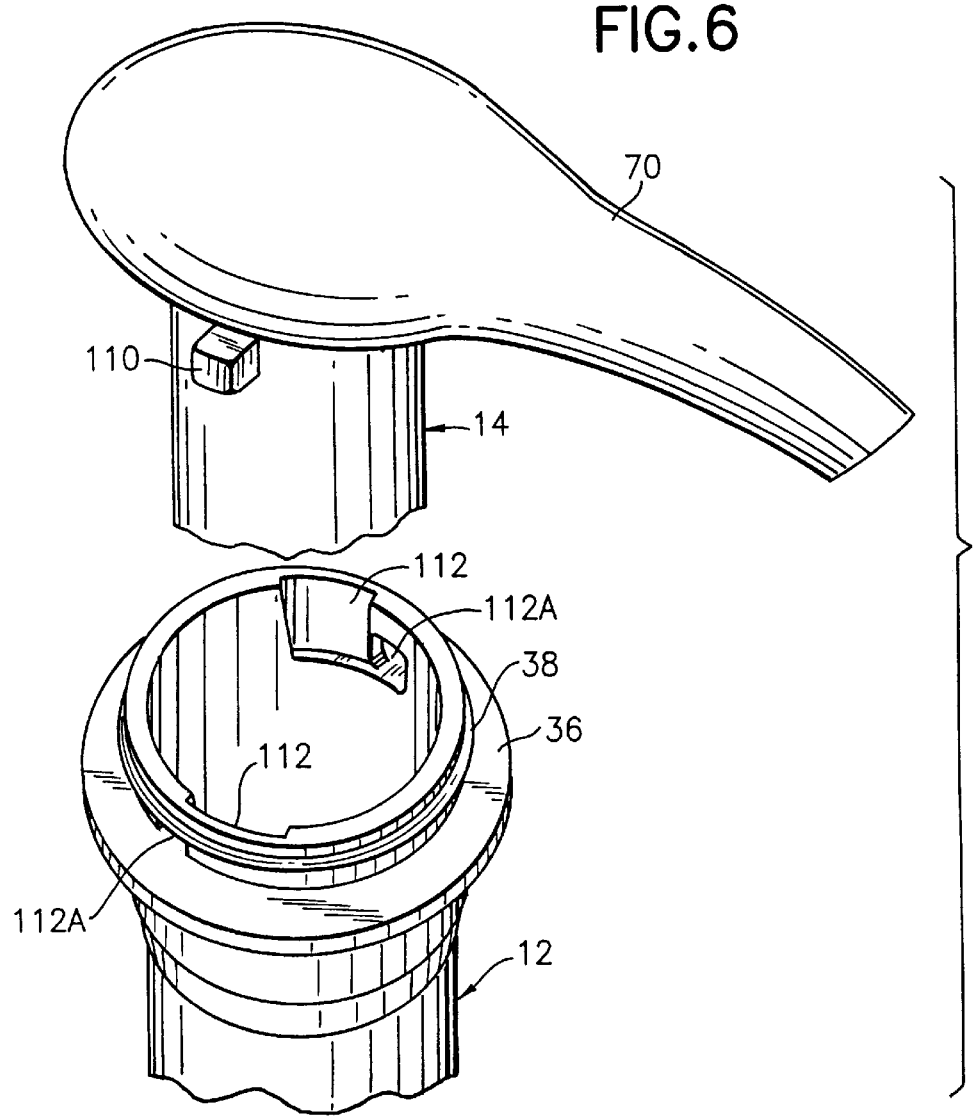
FIG. 7 is a fragmentary exploded view showing the actuator portion of the plunger and the upper part of the body.

The upper end of the plunger 14 and sleeve 34 are formed with interfitting lockdown means. This comprises the diametrically opposed outward pins 110 (FIG. 6) on the plunger 14 and the bayonet grooves 112 in the upper end of the pump body 12. As shown in FIGS. 6 and 7, the lower locking portion of the grooves is preferably a radial opening 112A.

The valving for the dispenser comprises the inlet check ball 81 which seats on seat 24 at the lower end of the body 12, and the discharge check ball 82 which seats on the inward lip 74 at the upper end of the plunger. In assembly, the ball 82 is installed by being forcibly inserted through the lip 74 from below. A spring 84 is compressively disposed between the annular face 58 and the bottom wall 18 of the body and urges the plunger upward.

The operation of the pump dispenser is as well known in the art exemplified by the Cooprider patent.

Attention is now directed to the method by which the dispenser of the invention is made. In the molding of the body 12 an annular inward and upward retaining flap 100 is formed unitary with the body 12 inward from the annular shoulder 32 and at the lower end of the cylindrical sleeve 34.

Figure 1A:
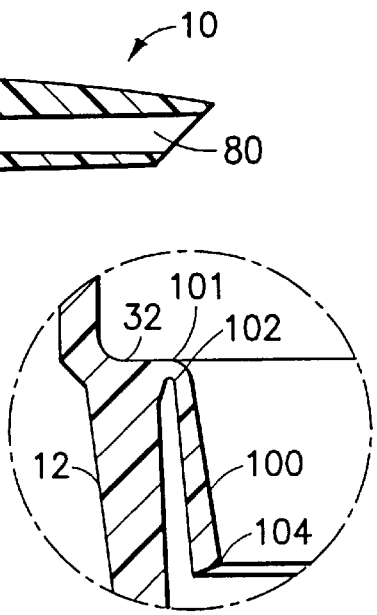
FIG. 1A is an enlarged fragmentary sectional view of the area of the flap as shown in FIG. 1.

As shown in FIG. 1A, the annular flap 100 has straight sides and is unitary with the body 12 and as molded extends upward from a juncture 101 at the inward edge of the shoulder 32 and inclines inwardly at a turn 102 at the juncture as shown. The flap 100 extends inward from the turn 102 at an angle of approximately 45° to the horizontal to an inward distal edge 104. Between the distal edge 104 and the turn 102 the flap 100 tapers slightly, narrowing toward the turn 102. By having the narrowest width of the flap at the turn 102, the fold of the flap at the turn during the shaping of the pump body is facilitated.

Figure 2:
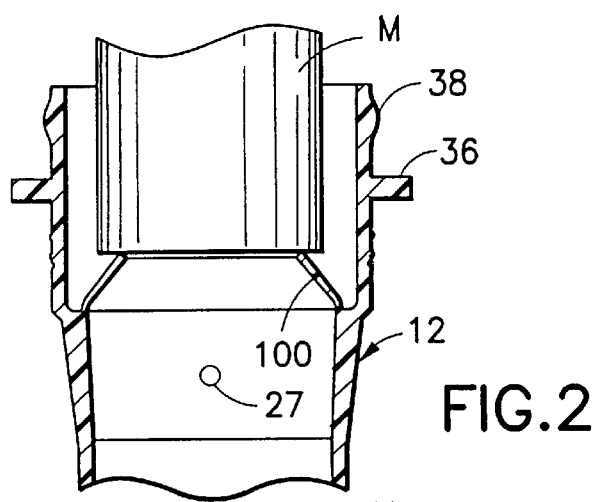
Figure 3:
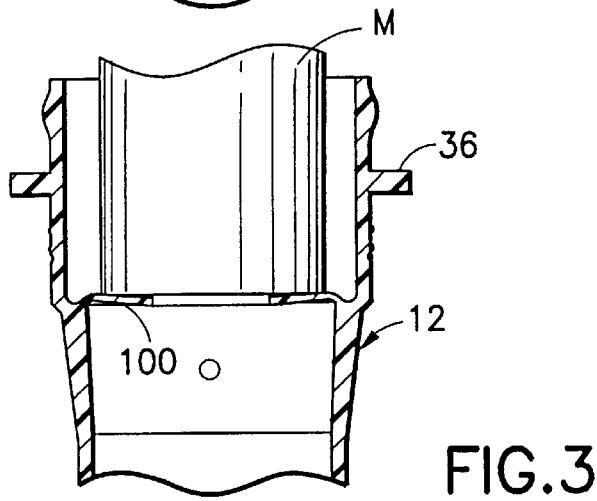

In the preparation of the body 12 (FIG. 2) a tool or mandrel M is inserted into the body. As the lower end of the mandrel M enters the body, it engages the flap 100 (FIG. 3) and deflects the flap to horizontal (FIG. 3). Further insertion of the mandrel bends the flap down (FIG. 4). The shape thus formed is a downward incline of the flap which could not be molded given the closed lower end of the body 12.

The mandrel M is removed.

In the assembly of the pump (FIG. 1) the plunger 14 is inserted into the body 12. The lower end of the piston head 52 engages the inner side of flap 100. Further insertion spreads the flap, and as the shoulder 54 (FIG. 1) of the piston passes the flap 100, the flap 100 snaps inwardly toward the side of the stem 51 of the piston. Any attempt at retraction of the plunger for that matter, will be stopped as the shoulder 54 on the piston engages the distal edge 104 of the flap 100. The flap thus becomes a lock, entrapping the plunger in the body.

The hold-down means shown in FIGS. 6 and 7 is engaged by depressing the plunger 14 while the pins 110 are in line with the vertical portion of the bayonet grooves 112. The pins 110 bottom out in the bottom of the grooves. The plunger is then turned clockwise to trap the pins 110 in the horizontal runs of the grooves 112 in line with the radial openings 112A.

The present invention provides a low-cost pump dispenser. An important aspect is the structure and method by which the plunger 14 is held in the body 12. This includes the flap 100, and the method of shaping the flap as described is also part of the invention. In contrast to what the art shows, this lock involves no additional parts and no special tools or swaging steps.

Variations in the product and method invention are possible. Thus, while the invention has been shown in only one embodiment and method, it is not so limited but is of a scope defined by the following claim language which may be broadened by an extension of the right to exclude others from making, using or selling the invention as is appropriate under the doctrine of equivalents.

What is claimed is:

1. A pump dispenser comprising:
   a. a resilient molded hollow body having a side wall and adjacent the upper end of the sidewall an inwardly directed integral annular flap inclined downwardly, the flap meeting the side wall at an annular juncture, the flap thinning in cross-section as the juncture is approached,
   b. a resilient molded plunger in the body having at its lower end a piston head sealingly engaging the inside of the hollow body and having an inward upwardly facing annular shoulder and an elongated stem reduced in diameter above the head, the stem being engaged by the flap.

2. A pump dispenser as claimed in claim 1 wherein the flap has straight sides.

3. For a pump dispenser, a molded hollow cup-shaped body comprising a bottom wall having a central inlet opening, and a continuous sidewall terminating upwardly in a circular mouth, the sidewall being integrally formed with an inwardly inclined annular flap joining the sidewall at an annular juncture, and the flap being manipulatable about the annular juncture to an inwardly and downwardly inclined position to constitute a retaining flap for blocking removal of a plunger operable in the body.

4. A pump dispenser comprising:
   a. a resilient molded hollow body having integrally molded adjacent its upper end a downwardly directed annular flap, the flap having an annular distal end and being thicker in cross-section as its distal end is approached,
   b. a resilient molded plunger in the body and having at its lower end a piston head sealingly engaging the inside of the hollow body and having an inward upwardly facing annular shoulder and an elongated stem reduced in diameter above the head, the flap engaging the stem.

5. A pump dispenser as claimed in claim 4 wherein the flap has straight sides.

6. For a pump dispenser, a plunger comprising a one-piece piston and actuator molded of a resilient plastic, the piston comprising a tubular piston head and stem having an axial passage with a defining circumferential inner surface, the actuator having a discharge passage connected to the axial passage, the plunger having an annular inward lip extending inward and downward into the axial passage, a portion of the lip having a central opening and being spaced radially inward from the inner surface so that the lip is free to flex outwardly, and a ball check above the lip and normally seated on the lip closing the opening, the lip being stretchable into the space between the lip and the inner surface so that the ball can be forced upward through the opening in assembly.

7. A method of assembling a pump dispenser comprising:
   a. providing a hollow cylindrical body molded of resilient material having an open upper end and having integrally formed inside the body adjacent its upper end an annular inwardly and upwardly inclined retaining flap having an annular juncture with the wall, an inner side and a distal inner edge,
b. providing a cylindrical tool,
c. moving an end of the tool into the body to engage the inner side of the flap and force the inner edge downward to fold the flap downward about the annular juncture,
d. providing a tubular plunger having at its lower end an enlarged piston head adapted to sealingly engage the surface of the inside of the body, the plunger having an inward shoulder and an elongated reduced stem above the piston head,
e. inserting the plunger, piston head first, into the upper end of the body and engaging the inner side of the retaining flap with the head to spread the distal inner edge of the flap, the distal inner edge of the flap thereafter blocking the piston head from upward removal from the body.

* * * * *